April 2, 1935. W. C. NUTT ET AL 1,996,433
BUMPER
Filed July 24, 1933 3 Sheets-Sheet 2
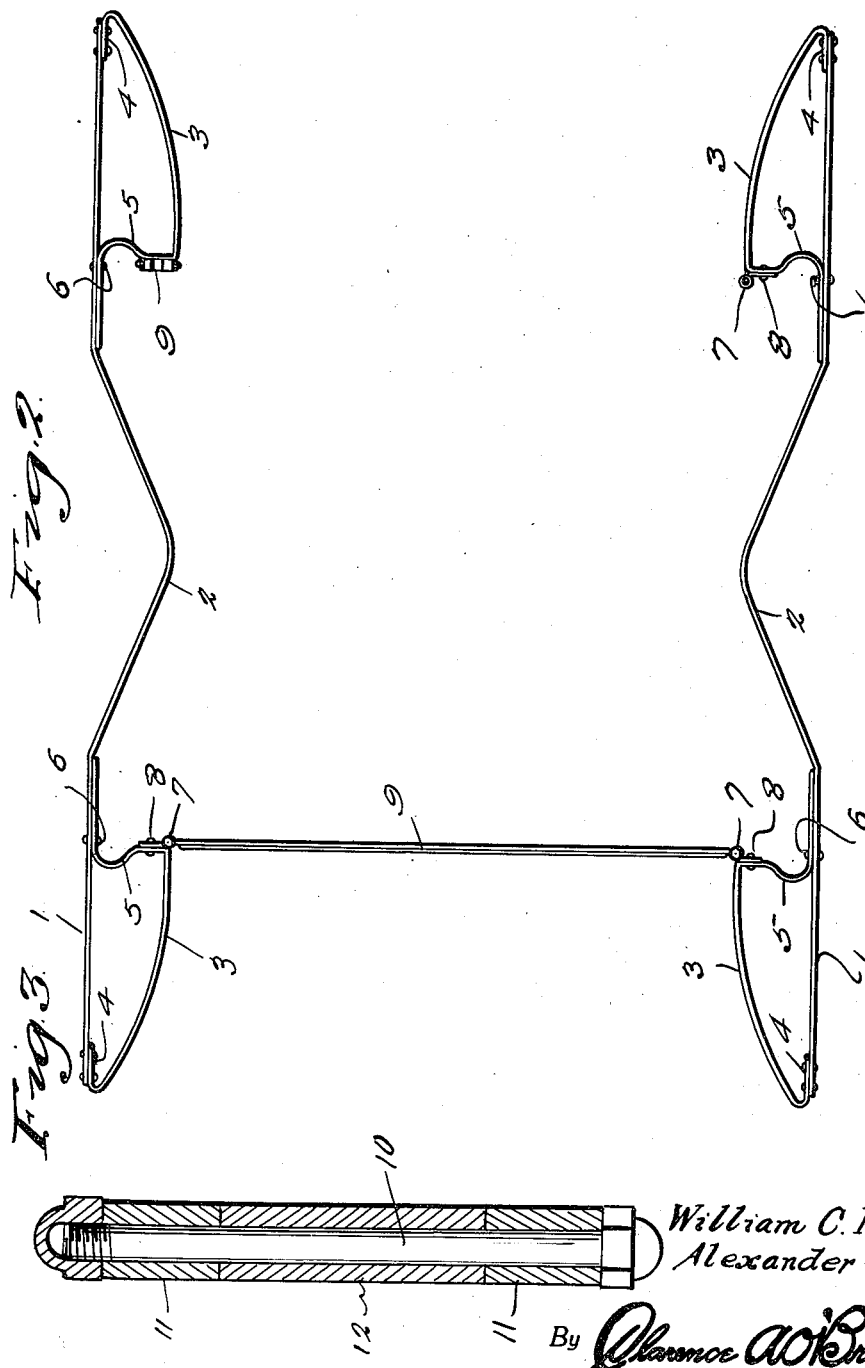
Inventor
William C. Nutt
Alexander Wood
By Clarence A O'Brien
Attorney April 2, 1935.  W. C. NUTT ET AL  1,996,433
BUMPER
Filed July 24, 1933  3 Sheets-Sheet 3
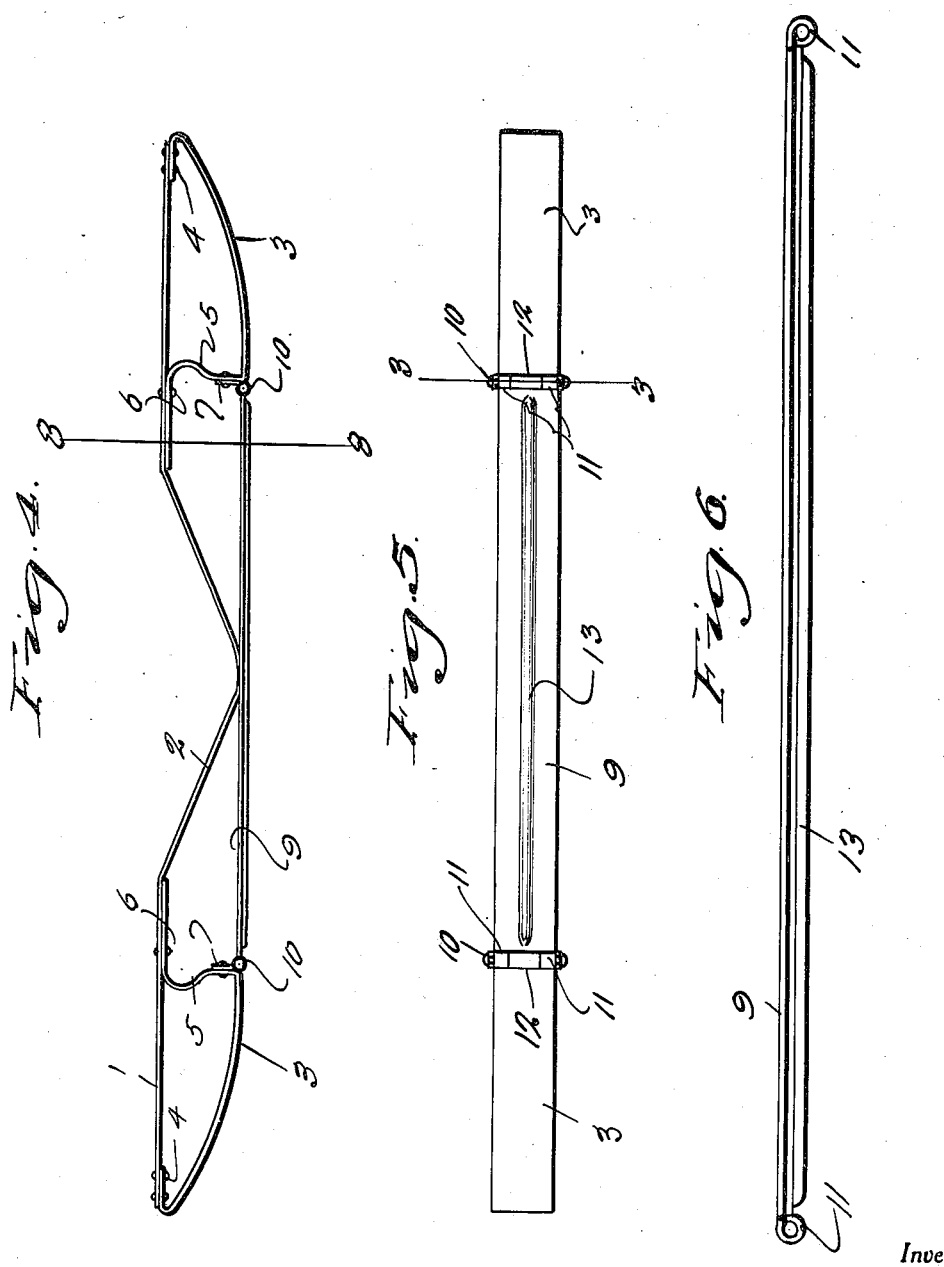
Inventor
William C. Nutt
Alexander Wood
By Clarence A. O'Brien
Attorney Patented Apr. 2, 1935

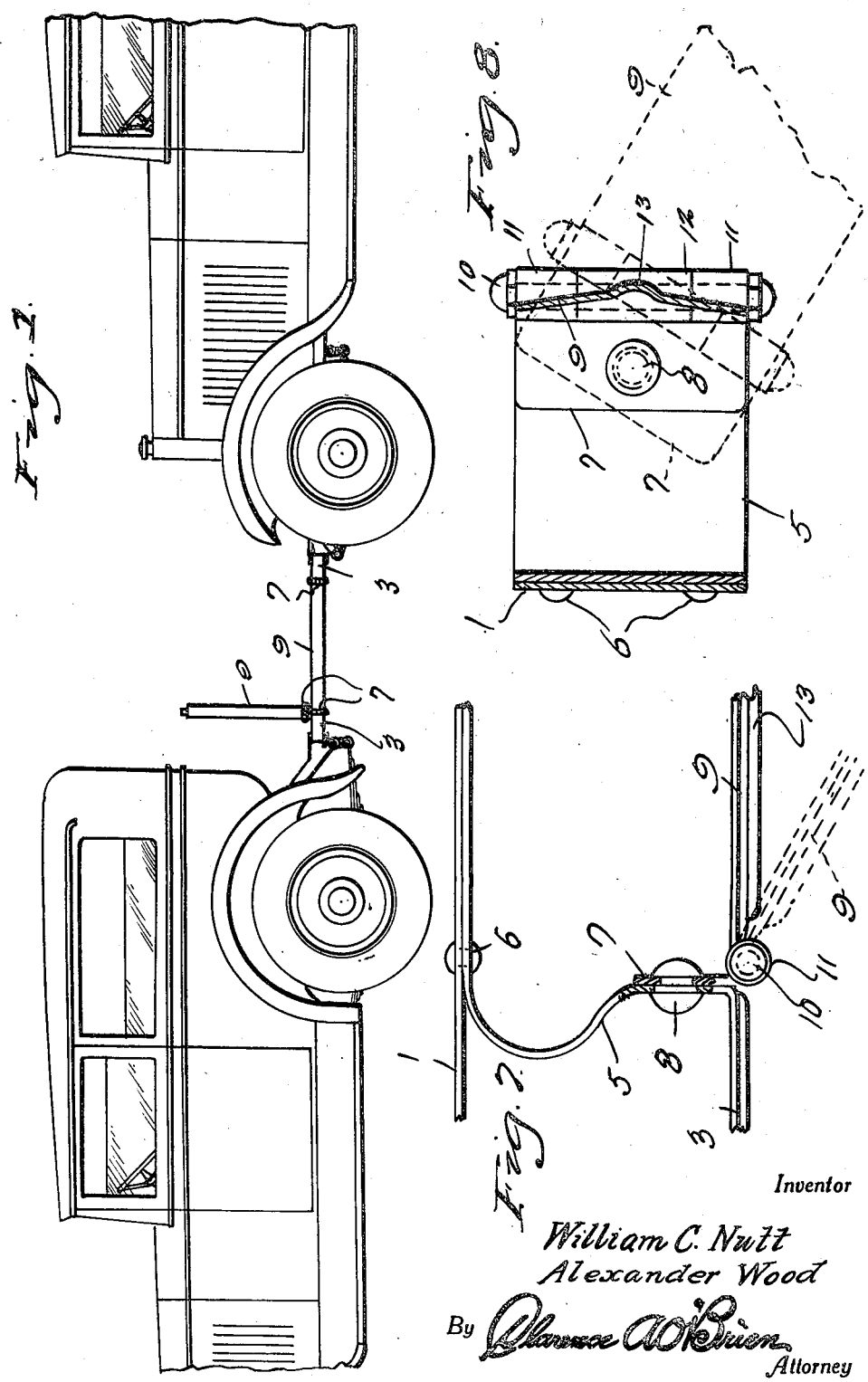

1,996,433

UNITED STATES PATENT OFFICE 1,996,433

BUMPER

William Carl Nutt and Alexander Wood, Youngstown, Ohio

Application July 24, 1933, Serial No. 681,978

1 Claim. (Cl. 293—55)

The present invention relates to new and useful improvements in automobile bumpers and has for its primary object to provide, in a manner as hereinafter set forth, a device of this character embodying novel means through the medium of which said bumper may be utilized for towing other automobiles equipped with similar bumpers.

Other objects of the invention are to provide an automobile bumper of the aforementioned character which will be simple in construction, strong, durable, efficient and reliable in use, compact, attractive in appearance, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a side elevational view, showing a bumper in accordance with the present invention, in use for towing purposes.

Figure 2 is a plan view, showing the invention being used for towing purposes.

Figure 3 is a view in vertical transverse section, taken substantially on the line 3—3 of Figure 5.

Figure 4 is a plan view of the bumper.

Figure 5 is an elevational view thereof.

Figure 6 is a detail view in plan of the tow bar.

Figure 7 is a fragmentary view, principally in plan, showing the means for connecting the tow bar.

Figure 8 is a view in vertical section through the bumper, taken substantially on the line 8—8 of Figure 4.

Referring now to the drawings in detail, it will be seen that the embodiment of the invention which has been illustrated comprises a supporting bar 1 which is to be mounted transversely on the front and rear of automobiles through the medium of any suitable brackets or other means, as suggested in Figure 1 of the drawings. The supporting bar 1 includes a substantially V-shaped intermediate portion 2.

Mounted on the end portions of the supporting bar 1 are angular deflector bars 3 having inturned outer end portions rigidly secured to the end portions of the supporting bar 1, as at 4. At their inner ends, the deflector bars 3 are bent to provide resilient braces 5 which extend to the bar 1 and terminate in inturned end portions rigidly secured to said bar 1, as at 6.

As illustrated to advantage in Figure 4 of the drawings, the portions of the braces 5 which are adjacent the bar 1 are bowed or curved to provide resiliency and portions of said braces 5 which are adjacent the deflector bars 3 are substantially straight. The reference numeral 7 designates hinges which are mounted for rotation in a vertical plane on the straight end portions of the braces 5 through the medium of headed rivets or similar securing elements 8 (see Figure 7). The reference numeral 9 designates a tow bar having its ends detachably or pivotally connected to the hinges 7 by removable pins 10, said tow bar having alined eyes 11 on its ends which straddle the eyes 12 of the hinges 7 to accommodate said pins 10. The tow bar 9 has pressed longitudinally therein a strengthening rib 13. The cross sectional shape of the tow bar 9 is illustrated to advantage in Figure 8 of the drawings. When both ends of the tow bar 9 are connected to the hinges 7, said tow bar is maintained under tension by the engagement therewith of the substantially V-shaped portion 2 of the supporting bar 1, thereby preventing rattle in addition to bracing said tow bar.

When the tow bar 9 is connected at both ends with the hinges 7, the bumper constituting the present invention is substantially conventional in appearance, as will be apparent. When it is desired to tow a car equipped with a similar bumper, the bar 9 of one of the bumpers is disconnected at one end and swung upwardly to an out of the way position, as suggested in Figure 1 of the drawings. Then, the opposite end of the bar 9 on the other bumper is disconnected and this bar 9 is swung rearwardly and connected with the first-named bumper, as clearly illustrated in Figure 2 of the drawings. The construction and arrangement of the hinges 7 is such that lateral and vertical movement of the towing and towed automobiles relative to each other such as will occur when turning or passing over uneven ground, will be permitted. The resilient braces 5 absorb shock to which the vehicles would otherwise be subjected.

It is believed that the many advantages of a bumper constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

A bumper of the class described comprising, in combination, a supporting bar including a substantially V-shaped intermediate portion, resilient angular deflector bars mounted on the end portions of said supporting bar, and a resilient tow bar pivotally and detachably connected, at its ends, to the angles of the deflector bars for swinging movement in a horizontal plane to a position at right angles to the supporting bar and for swinging movement in a vertical plane, said tow bar being engaged under tension, at an intermediate point, with the apex of the substantially V-shaped portion of the supporting bar.

WILLIAM CARL NUTT.
ALEXANDER WOOD.